(12) United States Patent
Tasse et al.

(10) Patent No.: US 12,450,834 B2
(45) Date of Patent: Oct. 21, 2025

(54) MODIFYING A PORTION OF A SEMANTICALLY SEGMENTED 3D MESH

(71) Applicant: STREEM, LLC, Portland, OR (US)

(72) Inventors: Ghislain Tasse, Portland, OR (US);
Nikilesh Urella, Portland, OR (US);
Pavan K. Kamaraju, London (GB)

(73) Assignee: STREEM, LLC., Portland, OR (US)

( * ) Notice: Subject to any disclaimer, the term of this patent is extended or adjusted under 35 U.S.C. 154(b) by 146 days.

(21) Appl. No.: 18/128,979

(22) Filed: Mar. 30, 2023

(65) Prior Publication Data
US 2024/0331292 A1 Oct. 3, 2024

(51) Int. Cl.
G06T 17/20 (2006.01)
G06T 7/11 (2017.01)
G06T 19/20 (2011.01)

(52) U.S. Cl.
CPC ............ G06T 17/20 (2013.01); G06T 7/11 (2017.01); G06T 19/20 (2013.01); G06T 2207/20084 (2013.01); G06T 2210/56 (2013.01); G06T 2219/2021 (2013.01)

(58) Field of Classification Search
CPC . G06T 19/20; G06T 7/11; G06T 17/20; G06T 2219/2021; G06T 2207/20084; G06T 2210/56
USPC ......................................................... 345/418
See application file for complete search history.

(56) References Cited

U.S. PATENT DOCUMENTS

| | | | |
|---|---|---|---|
| 2008/0243305 A1* | 10/2008 | Lee | G05D 1/0297 901/31 |
| 2019/0205485 A1* | 7/2019 | Rejeb Sfar | G06F 30/13 |
| 2019/0243928 A1* | 8/2019 | Rejeb Sfar | G06F 18/2413 |
| 2019/0311533 A1* | 10/2019 | Doh | G06T 7/70 |
| 2020/0302681 A1* | 9/2020 | Totty | G06T 15/205 |

OTHER PUBLICATIONS

Diaz-Vilariño L, Khoshelham K, Martínez-Sánchez J, Arias P. 3D modeling of building indoor spaces and closed doors from imagery and point clouds. Sensors. Feb. 2015; 15(2):3491-512.*
Budroni A, Boehm J. Automated 3D reconstruction of interiors from point clouds. International Journal of Architectural Computing. Jan. 2010;8(1):55-73.*
Engelmann et al., "3D-MPA: Multi Proposal Aggregation for 3D Semantic Instance Segmentation", arXiv:2003.13867v1 [cs.CV] Mar. 30, 2020.
Han et al., "OccuSeg: Occupancy-aware 3D Instance Segmentation", arXiv:2003.06537v3 [cs.CV] Apr. 28, 2020.

* cited by examiner

*Primary Examiner* — Phu K Nguyen
(74) *Attorney, Agent, or Firm* — Schwabe Williamson & Wyatt

(57) ABSTRACT

Embodiments include systems, processes, and/or techniques for creating a semantically segmented 3D mesh of a physical environment, where the semantically segmented 3D mesh may be at least partially created by a first user, and where a second user, for example a service professional, may view and modify one of the segments of the semantically segmented 3D mesh for subsequent viewing by the first user. Other embodiments may be described and/or claimed.

18 Claims, 12 Drawing Sheets

MODIFYING A PORTION OF A SEMANTICALLY SEGMENTED 3D MESH

TECHNICAL FIELD

The present disclosure relates to the field of three-dimensional (3D) modeling of objects in a physical environment, and in particular to semantically segmenting a 3D model to modify individual 3D segments associated with those objects.

BACKGROUND

Devices such as smartphones and tablets are increasingly capable of supporting 3D modeling and augmented reality (AR) based on physical environments. These devices may capture images, video, and/or 3D models of physical environments using, for example, LIDAR. Depending upon the particulars of a given 3D modeling or AR implementation, the captured images or video may be processed using various algorithms to detect features in the images or video, such as planes, surfaces, faces, and other recognizable shapes. As a result, a point cloud or a 3D mesh may then be created.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
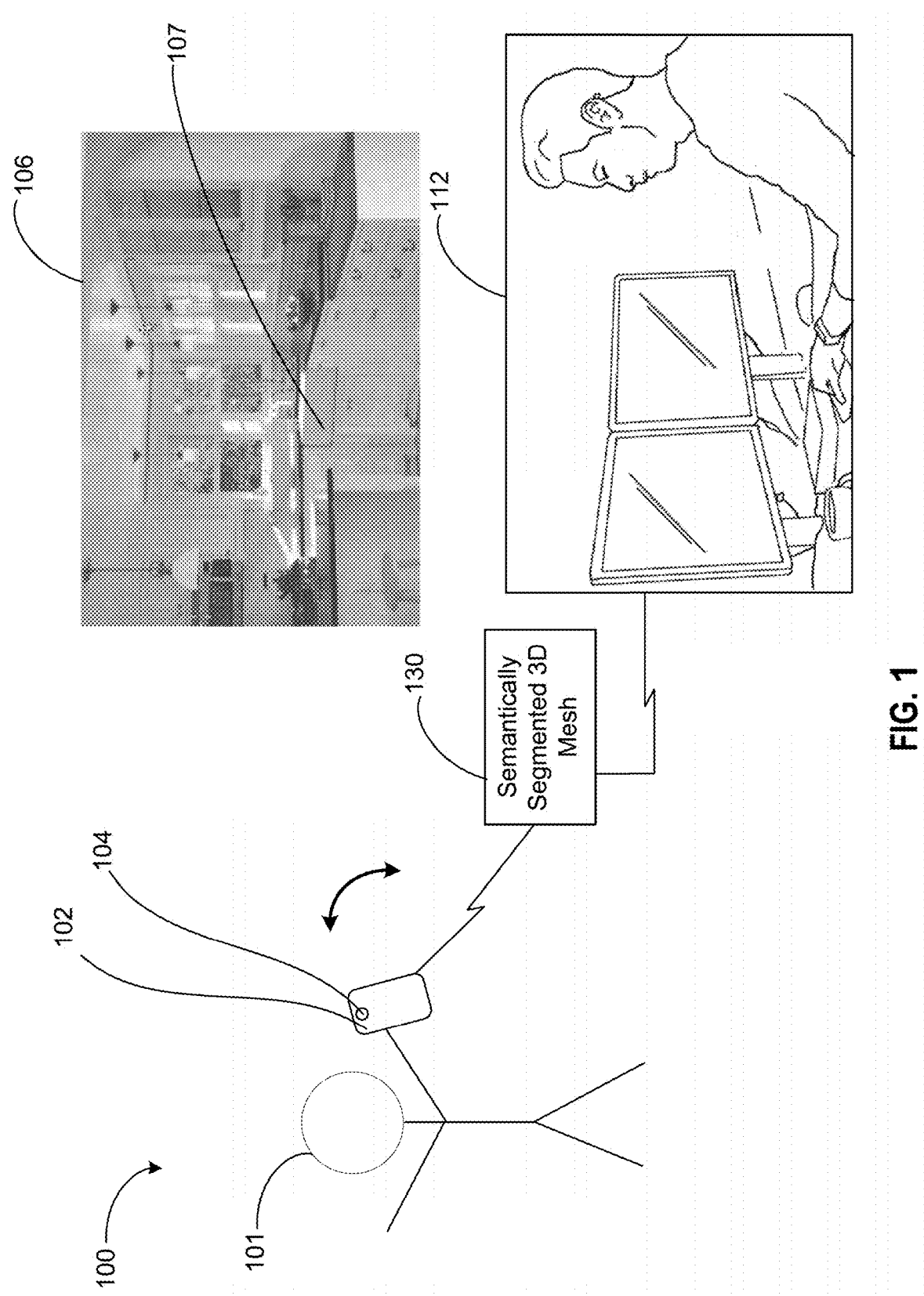
FIG. 1 illustrates a context diagram of a user capturing a 3D model of a physical environment, where the 3D model is semantically segmented and sent to a service professional for modification, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

A physical environment, for example an interior of one or more rooms within a building or areas of an exterior or outdoor space, may be represented by one or more 3D models. In embodiments, these 3D models may be implemented as a point cloud or a 3D mesh that includes representations of one or more objects in the physical environment. One of the one or more objects may themselves include sub-objects. For example, objects represented in a 3D model within an indoor physical environment may include a table, a chair, a lamp, a bookcase, a desk, a sink, shelves, cabinets, and the like. Objects in a 3D model within an outdoor physical environment may include furniture, plants, buildings, berms, water features, pathways, rocks, bridges, or other landscape features.

In embodiments, a 3D model, represented by a point cloud or a 3D mesh, may be created by using image and/or video capture of the physical environment, for example through a camera associated with a device such as a smartphone or a tablet. Sometimes, other data, such as available motion data, such as a gyroscope and/or accelerometers contained within the device, may be used to compute a point cloud. The point cloud typically includes one or more points that are indicated by an x, y position within the video frame along with a depth (or z-axis). The points are often tied to an identified anchor feature within the frame, e.g. a corner or edge of an object in-frame, which can be readily identified and tracked for movement between frames. The associated x, y, and z values allow the point to be identified in space relative to the device. As may be appreciated, these x, y, and z values will continuously change for each detected/calculated point as the camera of the capturing device moves in space relative to the anchor features.

In embodiments, a 3D mesh may be created using a device, for example a smartphone or a tablet, that includes LIDAR or other techniques used to capture images that include a depth component. In embodiments, image information from frames may be mapped on the 3D mesh to effectively create a relatively photo-accurate 3D model of the physical environment. The 3D mesh, in embodiments, can be manipulated, for example parts of the 3D mesh edited, added, or removed, and viewed from perspectives different from the original capturing device.

In some embodiments, a 3D model can be progressively generated and expanded on the fly as the image capturing device continues to move about the physical environment, viewing previously uncaptured portions of the physical environment. When the capturing device moves back to previously viewed portions of the environment, the 3D model can be augmented and/or refined, particularly where the capturing device is viewing the previously viewed portions at a different perspective, even if only slightly different from the initial perspective. In embodiments, the point cloud or the 3D mesh may be created on a server device or may be created within a cloud infrastructure, based upon information captured by a consumer device.

In embodiments, the 3D mesh or the point cloud may be provided to a neural network, or may be subject to other deep learning methods, to produce a semantically segmented 3D mesh, which may be referred to as a semantically segmented 3D mesh or as a semantically segmented 3D point cloud.

A semantically segmented 3D mesh may include a plurality of segments that are identified by the neural network and associated with labels and/or identifiers that identify the type of objects that are associated with each of the plurality of segments. For example, a first plurality of segments of a 3D mesh may indicate the location of chairs within a physical environment, and a second plurality of segments of the 3D mesh may include tables within the physical environment.

Thus, in embodiments, a semantically segmented 3D mesh may be searched by a name or an image of a desired object to be found within the semantically segmented 3D mesh. For example, a semantically segmented 3D mesh of an interior of a house may be searched for an object "chair" and each of the segments within the semantically segmented 3D mesh that are associated with the object "chair" may be returned. In another example, a search may be performed for all furniture within any bedroom, with the associated segments showing the furniture within one or more bedrooms within the semantically segmented 3D mesh returned.

In embodiments, at this point the associated segments that are returned from the search may be included with other segments of the semantically segmented 3D mesh in order to form a portion of the semantically segmented 3D mesh. This portion may then be sent to another device, for example a computer or some other device of a service professional, who is able to view the portion of the semantically segmented 3D mesh and to make modifications to objects represented within the portion of the semantically segmented 3D mesh. For example, the service professional, who may be a designer or a contractor, may add, remove, move, or otherwise modify objects within the portion of the semantically segmented 3D mesh. The modified portion of the semantically segmented 3D mesh may then be sent back to the customer for review.

For example, a service professional may download a semantically segmented 3D mesh of a kitchen from a computer server for viewing. The semantically segmented 3D mesh may originate from a smartphone scan by a customer of the customer's kitchen. The service professional may then search the semantically segmented 3D mesh for a refrigerator. The resulting segments of the semantically segmented 3D mesh associated with a refrigerator may then be presented to the service professional, who may then modify the semantically segmented 3D mesh by removing the refrigerator or replacing it with a different style of refrigerator within the semantically segmented 3D mesh. The modified semantically segmented 3D mesh, which includes images, may then be uploaded to the server, or may be sent directly to the customer's device for viewing. In this example, both the service professional and the customer may either create and/or download the semantically segmented 3D mesh to have the 3D model rendered on their local devices, or may remotely access the server to display the semantically segmented 3D mesh on the device, for example within a browser window. In embodiments, and as used herein, a semantically segmented 3D mesh may also be referred to as a semantically segmented 3D model. Additionally, in embodiments, a semantically segmented 3D mesh may also be referred to as a segmented 3D mesh or a segmented 3D model, which may have been segmented using a technique other than semantic segmentation.

FIG. 1 illustrates a context diagram of a user capturing a 3D model of a physical environment, where the 3D model is semantically segmented and sent to a service professional for modification, in accordance with various embodiments. Diagram 100 shows an example of a user 101 using a smartphone 102 that includes a camera 104 to take one or more images of a physical environment of a kitchen 106. In embodiments, the camera 104 may be used to scan the kitchen 106 from multiple directions in order to capture multiple images from different angles. In embodiments, the smartphone 102 may include capabilities such as LIDAR, that are able to capture images with depth information of the kitchen 106.

In embodiments, the smartphone 102 may be a consumer device operated by the user 101, which may be implemented as a computer device 1100 of FIG. 11, to be discussed in greater detail below. In other embodiments, the smartphone 102 may be implemented as a variety of different possible devices, such as a computer (desktop or laptop), a tablet, a two-in-one laptop, a hybrid laptop, smart glasses, or any other computing device that can accept or include a camera and may provide necessary positional information for images captured. Camera 104 may be used to capture the surrounding environment of smartphone 102, and by extension, the surrounding environment of the user 101. The environment may include one or more 3D objects as shown in kitchen 106, which may include, for example, the sink 107.

Camera 104 may be any camera that can provide a suitable video stream for the intended purpose of smartphone 102. Where smartphone 102 is implemented as a tablet or another device, camera 104 may be one or more built-in cameras. In other embodiments, such as where smartphone 102 is a laptop, camera 104 may be built in or a separate, external unit. Images captured by the camera 104 may include a video stream, which may be a digital video stream, and may be compressed in embodiments with some form of video compression, such as AVC-HD, H.264, MPEG-4, or another suitable compression scheme.

Camera 104 may be configured to output standard or high-definition video, 4K video, or another resolution of video suitable for the intended purpose of camera 104 and smartphone 102. In other embodiments, for example where smartphone 102 is equipped with multiple cameras or similar sensors, one or more of the sensors may be configured to directly detect depth points, such as a 3D camera, LIDAR, or other suitable depth-sensing technology.

Images from the camera 104 may then be used to create a 3D model, which may be a point cloud or a 3D mesh, which may then be subsequently semantically segmented to create the semantically segmented 3D mesh 130. The semantically segmented 3D mesh 130 includes segments, discussed further below, that may correspond to one or more objects in the physical environment, for example the sink 107 within the kitchen 106.

In embodiments, deep learning techniques, which may include neural network techniques, may be used to identify the different segments in the 3D model to produce the semantically segmented 3D mesh 130. In some embodiments, portions or all of the semantically segmented 3D mesh 130 may be produced within the smartphone 102. In other embodiments, portions or all of the semantically segmented 3D mesh 130 may be produced within other devices, for example at a server at another location, as discussed further below.

In embodiments, portions of the semantically segmented 3D mesh, for example a semantically segmented 3D mesh that includes the sink 107 within the kitchen 106, may be sent to a service professional 112. In embodiments, the service professional 112, using a computer, may review the received portion of the semantically segmented 3D mesh, update the semantically segmented 3D mesh with a suggested different type of sink, and then send the updated semantically segmented 3D mesh back to the smartphone 102. At that point, the user 101 may be able to review the suggested changes and may then decide whether to proceed with the suggested replacement of the sink 107.

Figure 2:
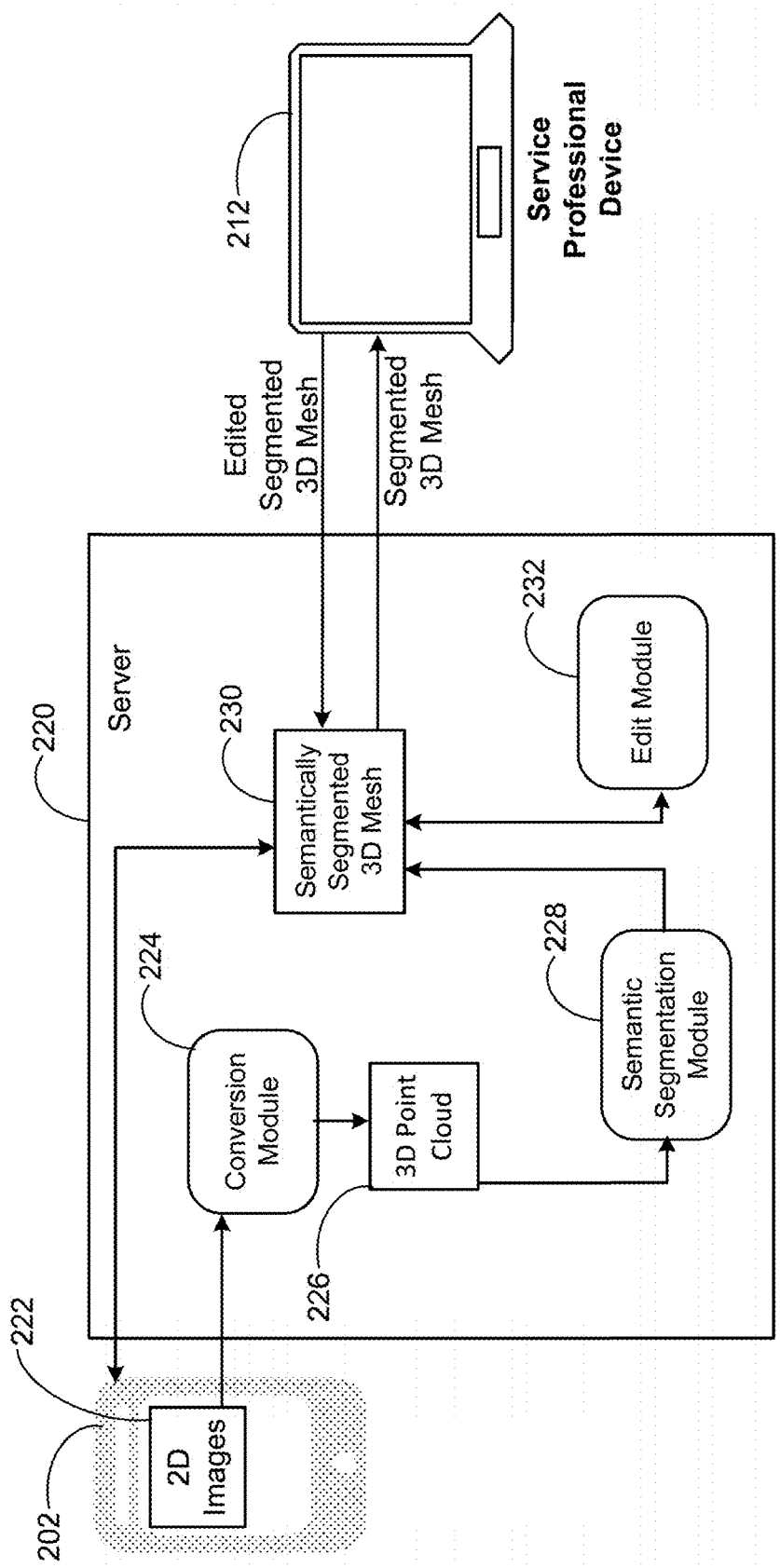
FIG. 2 shows an example block diagram of a high level process flow that includes a server to create and/or store a semantically segmented 3D point cloud model from 2D images, in accordance with various embodiments.

FIG. 2 shows an example block diagram of a high level process flow that includes a server to create and/or store a semantically segmented 3D point cloud model from 2D images, in accordance with various embodiments. In embodiments, a device 202, which may be similar to smartphone 102 of FIG. 1, may be used to capture a plurality of 2D images 222 of a physical environment, such as a kitchen 106 of FIG. 1. In embodiments, the plurality of 2D images 222 may be sent to a server 220. In embodiments, the server 220 may include one or more devices that may be similar to the computer 1100 of FIG. 11. In embodiments, the server 220 may include other components, for example deep learning or neural network software and/or hardware components as discussed further below. In embodiments, all or portions of the server 220 may be on the device 202. In some embodiments, the server 220 may be implemented as a virtual server in a cloud or web-services environment.

In embodiments, the server 220 may include a conversion module 224 that may be used to convert the plurality of 2D images 222 to a 3D point cloud 226. In embodiments, the server 220 may include a semantic segmentation module 228 that may take as input the 3D point cloud 226 and produce a semantically segmented 3D mesh 230. In embodiments, during operation, the semantic segmentation module 228 may use deep learning techniques that may involve neural networks having three or more layers.

In embodiments, all or part of the semantically segmented 3D mesh 230 may be stored on the server 220, may be sent to the device 202 for viewing by the user such as user 101 of FIG. 1, or may be sent to a service professional such as service professional 112 of FIG. 1 for viewing and/or editing on a service professional device 212. In embodiments, an edit module 232 that may be on the server 220 may be used to revise, update, and/or otherwise modify the semantically segmented 3D mesh 230. In embodiments, this may be done by service professional device 212 which may be operating at a remote site and accessing the edit module 232 on the server 220 by using a browser. In other embodiments, all or part of the edit module 232 may be on computer equipment, such as a laptop, a tablet, or some other computing device, belonging to the service professional 112.

In embodiments, all of the 2D images 222 on the device 202 may be completely scanned before they are sent to the conversion module 224, where the full set of 2D images 222 may be then be used to create a complete 3D Point cloud 226 before being converted to a semantically segmented 3D mesh 230 by the semantic segmentation module 228. In other embodiments, a portion of the 2D images 222 on the device 202 may be sent to the conversion module 224 to create a partial 3D point cloud 226 at the same time as the device 202 is scanning the physical environment. The semantic segmentation module 228 may be then used to convert the partial 3D point cloud 226 to a partial segmented 3D mesh 230 to be stored on the server 220. As additional 2D images 222 are captured, these additional images may be sent to the conversion module 224 to update the 3D point cloud 226, which may then be used to update the semantically segmented 3D mesh 230. For example, if a customer using device 202 is photographing or videoing a kitchen, for example the kitchen 106 of FIG. 1, the server 220 may be building the semantically segmented 3D mesh 230 as the images from the photographs and/or videos arrive at the server 220.

Figure 3:
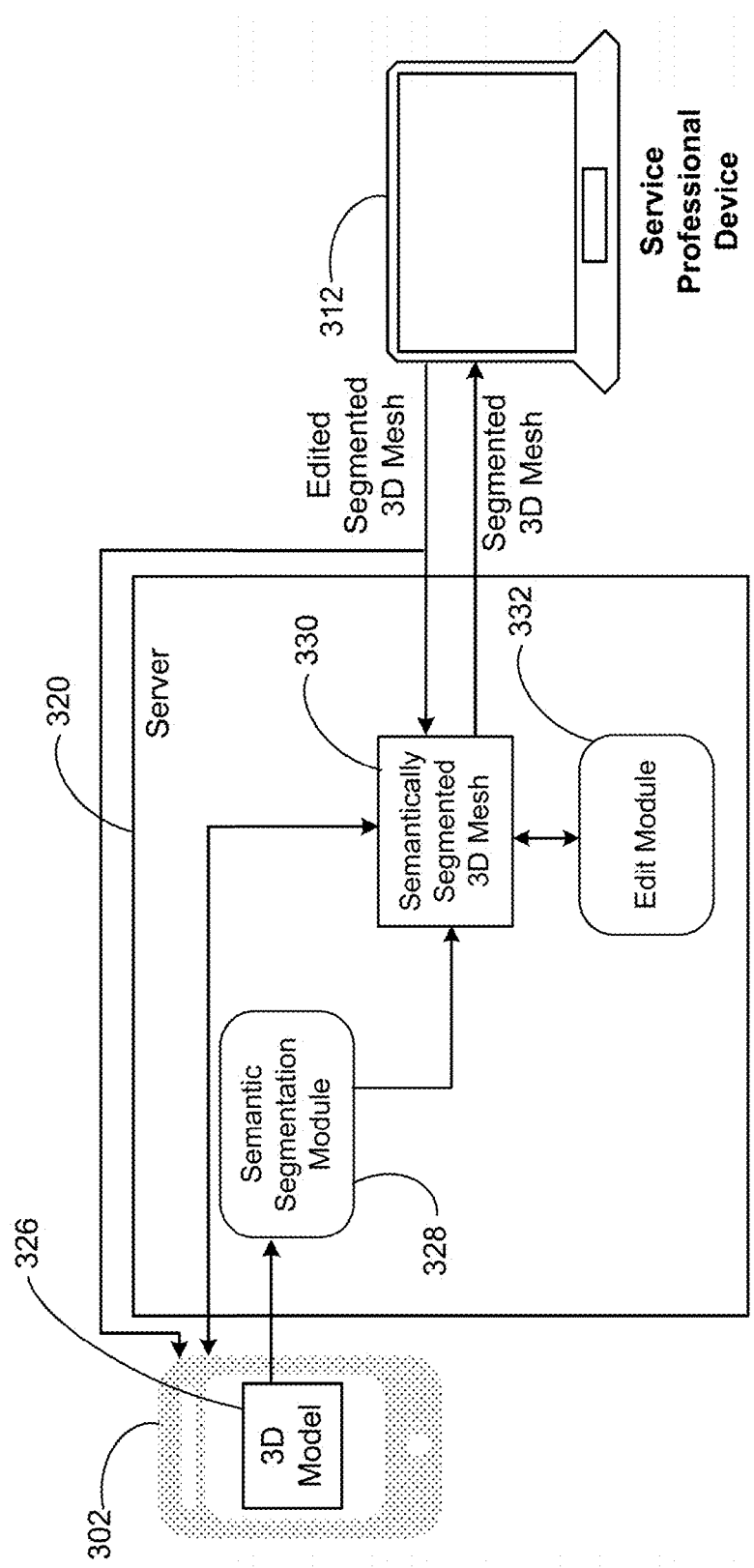
FIG. 3 shows an example block diagram of high-level process flows that includes a server to create and/or store a semantically segmented 3D mesh from a 3D model on a smartphone, in accordance with various embodiments.

FIG. 3 shows an example block diagram of high-level process flows that includes a server to create and/or store a semantically segmented 3D mesh from a 3D model on a smartphone, in accordance with various embodiments. In embodiments, a device 302, which may be similar to smartphone 102 of FIG. 1, may be used to capture a 3D model 326 on the device 302. In embodiments, the 3D model 326 may be captured using LIDAR or other techniques available on the device 302 that may be used to capture and/or render 3D representations of a scanned environment.

In embodiments, the 3D model 326 may be sent to a server 320, which may be similar to server 220 of FIG. 2. In embodiments, the server 320 may include one or more devices, which may be similar to computing device 1100 of FIG. 11. In embodiments, the server 320 may include other infrastructure components and/or service components, for example deep learning or neural network software and/or hardware components as discussed further below. In embodiments, portions or all of the server 320 may be on the device 302. In embodiments, portions or all of the server 320 may be in a virtual computing environment.

In embodiments, the server 320 may include a semantic segmentation module 328 that may be used to provide a semantically segmented 3D mesh 330 based upon the received 3D model 326. In embodiments, the semantic segmentation module 328 may use deep learning techniques. In embodiments, for example, the semantic segmentation module 328 may use a neural network that may have three or more layers.

In embodiments, all or part of the semantically segmented 3D mesh 330 may be sent to the device 302 for viewing by a user, such as user 101 of FIG. 1, or may be sent to a service professional device 312, which may be similar to service professional device 212 of FIG. 2 for viewing and/or for editing. In embodiments, an edit module 332 that may be on the server 320 may be used to revise, update, and/or otherwise modify the semantically segmented 3D mesh 330. In embodiments, this may be done via the service professional device 312 which may be operating at a remote site and accessing the edit module 332 using a browser. In other embodiments, all or part of the edit module 332 may be on computer equipment, such as a laptop, a tablet, or some other computing device, that may be part of the service professional device 312.

In embodiments, all of the 3D model 326 on the device 302 may be completely constructed before it is sent to the semantic segmentation module 328, where the semantically segmented 3D mesh 330 may be created. In other embodiments, a portion of the 3D model 326 on the device 202 may be sent to the semantic segmentation module 328 to create a partial semantically segmented 3D mesh 330. As additional features of the 3D model 326 are captured by the device 302 by continued scanning, these additional features may be sent to the semantic segmentation module 328 which may then be used to update the semantically segmented 3D mesh 330. For example, if a customer using device 302 is continuing to scan the kitchen, for example the kitchen 106 of FIG. 1, the server 320 may be continuing to build the semantically segmented 3D mesh 330 as newly scanned features of the updated 3D model 326 arrive.

In embodiments, the 3D model 326 may be a 3D mesh, and the semantically segmented 3D mesh 330 may be referred to as a semantically segmented 3D mesh. In embodiments, frames from video or other images that are captured by the device 302 (and/or other sources of relevant images) that are associated with the 3D model 326 may be incorporated within the semantically segmented 3D mesh 330 to provide a visual experience that may be similar to viewing the physical environment.

Figure 4A:
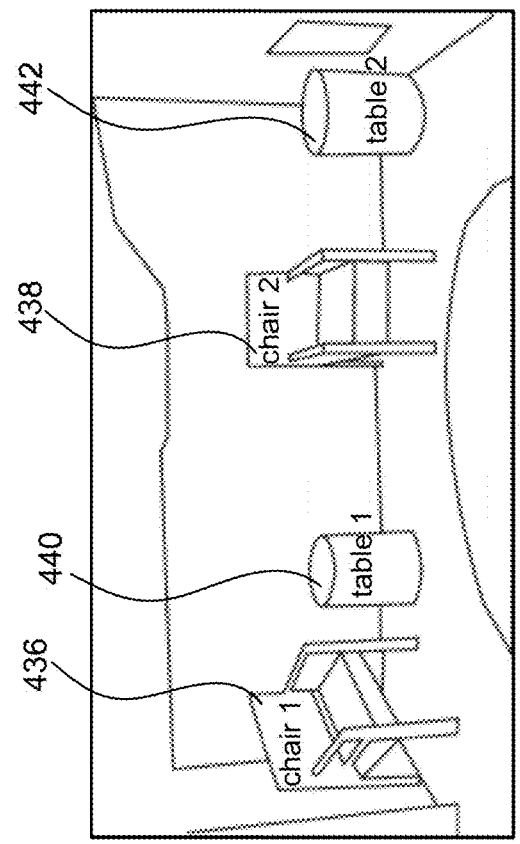
FIGS. 4A-4C illustrate examples of a 3D model with various levels of semantic segmentation, in accordance with various embodiments.
Figure 4B:
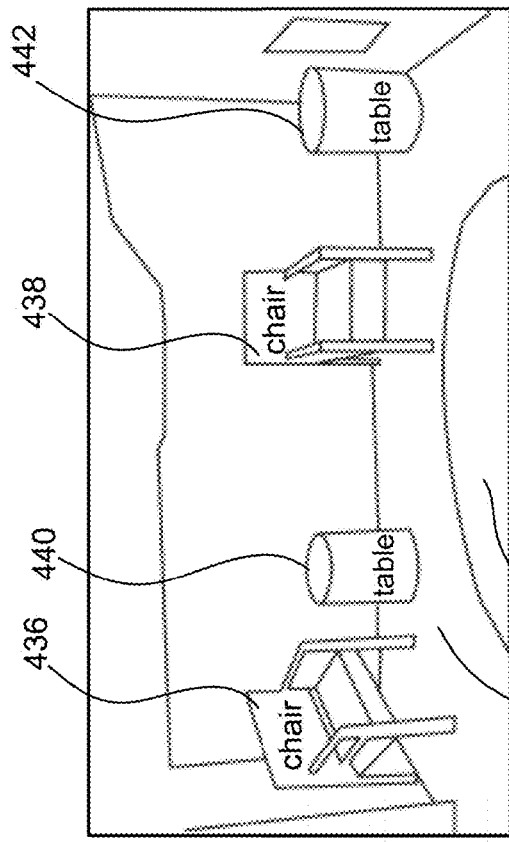
Figure 4C:
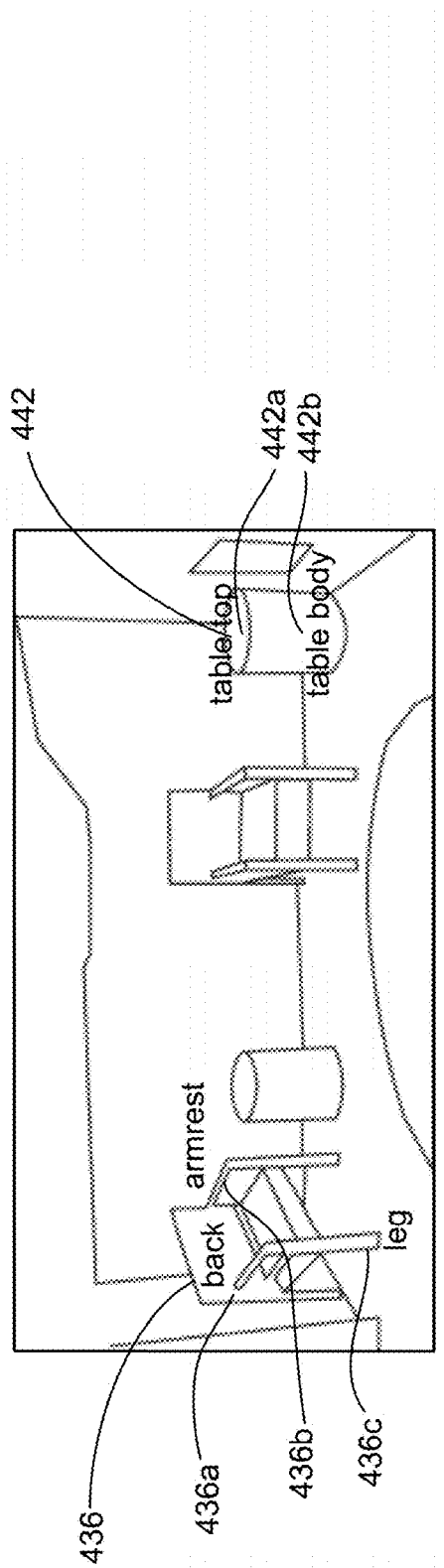

FIGS. 4A-4C illustrate examples of a 3D model with various levels of semantic segmentation, in accordance with various embodiments. FIG. 4A shows an example of a two-dimensional view of a semantically segmented 3D mesh, which may be similar to semantically segmented 3D mesh 330 of FIG. 3. A floor 434 is shown that includes a rug 434a. Chairs 436, 438 and tables 440, 442 are on the floor 434. Note that in this example embodiment, the neural network that may be a part of the semantic segmentation module 328 has identified and labeled chairs 436, 438 as "chair" objects. Similarly, the neural network has identified and labeled tables 440, 442 as "table" objects.

FIG. 4B shows an example of a two-dimensional view of a semantically segmented 3D mesh, which may be similar to FIG. 4A. However, in FIG. 4B, the semantic segmentation module has identified chair 436 as a "chair 1" object and chair 438 as a "chair 2" object. In this example embodiment, the objects identified as chairs 436, 438 have been further segmented into individual objects within a class of objects and has given them individual labels. Similarly, the semantic segmentation module has identified table 440 as a "table 1" object and table 442 as a "table 2" object. Thus, the objects identified as tables 440, 442 have been further segmented into individual objects with respective individual labels.

FIG. 4C shows an example of a two-dimensional view of a semantically segmented 3D mesh, which may be similar to FIG. 4B, where the semantic segmentation includes details of specific objects. For example, the chair 436, which may be an object labeled "chair 1" may also include other segments such as the chair back 436a labeled "back," a chair armrest 436b labeled "armrest," and chair leg 436c that is labeled "leg." Similarly, the table 442, which may be an object labeled "table 2," may include other segments such as a table top 442a that is labeled "tabletop" and a table body 442b that is labeled "table body." As discussed further below, these different objects may be searched for within a semantically segmented 3D mesh by the label given to objects within the semantically segmented 3D mesh.

Figure 5:
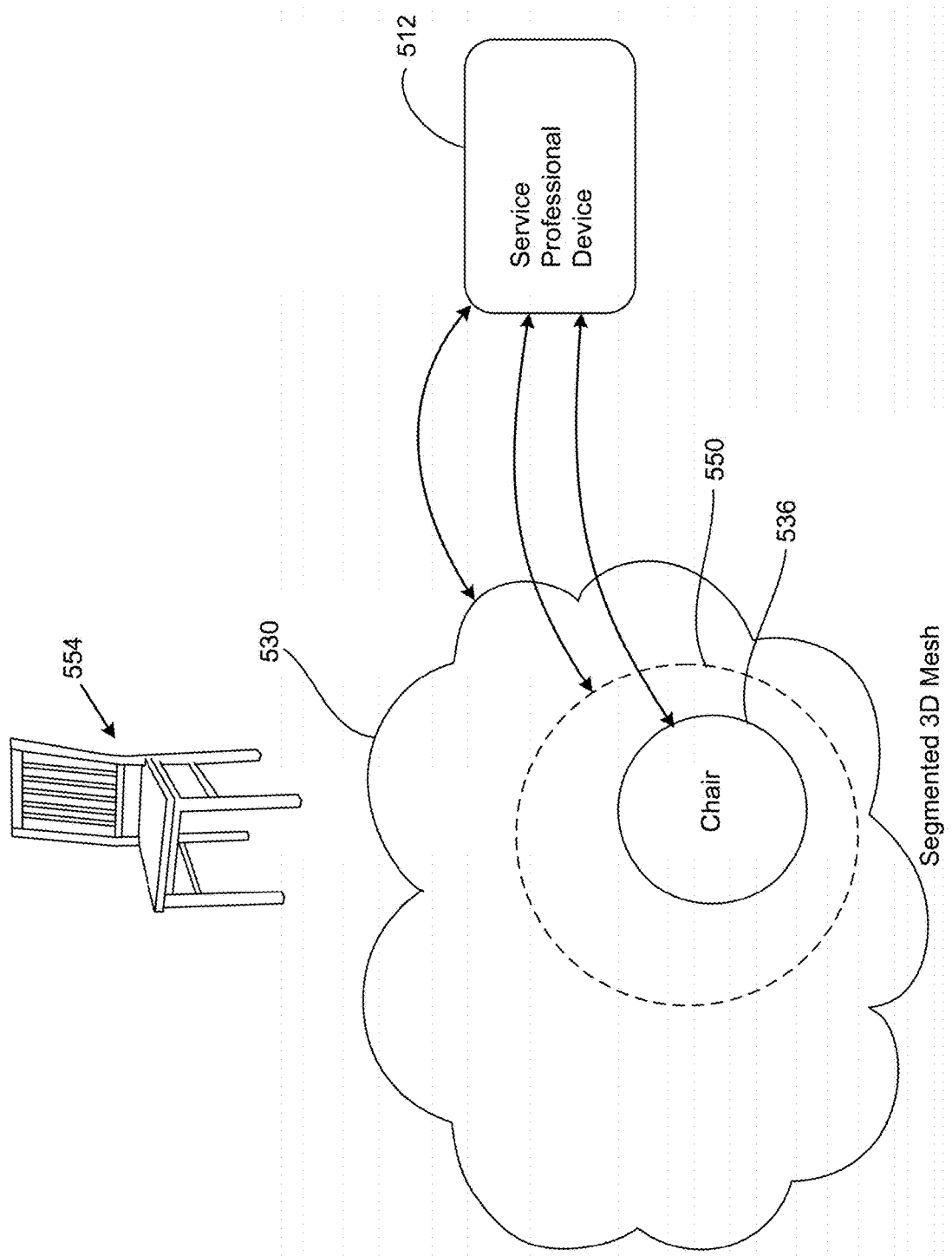
FIG. 5 includes diagrams to illustrate techniques for identifying portions of a semantically segmented 3D mesh, in accordance with various embodiments.

FIG. 5 includes diagrams to illustrate techniques for identifying portions of a semantically segmented 3D mesh, in accordance with various embodiments. Semantically segmented 3D mesh 530 is spatially represented, and may be similar to semantically segmented 3D mesh 230 of FIG. 2 or of semantically segmented 3D mesh 330 of FIG. 3. Semantically segmented 3D mesh 530 may also be similar to the semantically segmented 3D mesh as shown with respect to FIGS. 4A-4C.

In embodiments, a service professional such as service professional 112 of FIG. 1 may use a service professional device 512, which may be similar to service professional device 212 of FIG. 2 or service professional device 312 of FIG. 3, to access all or part of the semantically segmented 3D mesh 530 for viewing and updating. In some embodiments, the service professional device 512 may be used to remove and/or modify segments within the semantically segmented 3D mesh 530 that represents suggested changes to physical objects in the physical environment. This removal or modification may be used to create a modified segmented 3D mesh, which may then be sent back to a user, such as user 101 of FIG. 1, to view on a device, such as device 302 of FIG. 3. The user may then review and comment on the modifications and send feedback back to the service professional.

In embodiments, the service professional may use the service professional device 512 to search the semantically segmented 3D mesh 530 to find segments that represent one or more objects in the physical environment for attention. For example, a segment 536 represented by circle may identify a chair within a physical environment, which may be similar to chair 436 of FIG. 4A. A plurality of segments 550 shown by a dashed circle may include a number of objects that may be proximate to the chair represented by segment 536, for example the table 440 and a portion of the floor 434 of FIG. 4A.

In embodiments, the service professional device 512 may be used to search for a chair within the semantically segmented 3D mesh 530 in a number of ways. In embodiments, the service professional device 512 may be used to search for the word "chair" that is a label within the semantically segmented 3D mesh 530. This would be used to find and to view segment 536 that includes a chair within the semantically segmented 3D mesh 530. In embodiments, an image 554 of a chair may be used for the search, and a pattern matching algorithm may be used to search the semantically segmented 3D mesh 530 to view the segment 536 of the semantically segmented 3D mesh 530 that includes the chair. In embodiments, segments 550 may include additional segments of the semantically segmented 3D mesh 530 that represent objects that may be physically near the segment 536 that includes a chair to provide additional environmental context around the chair.

Although FIG. 5 shows a segment 536 of a single chair and segments 550 around the segment 536, in embodiments multiple segments 536 and multiple segments 550 that are instances of context around the segments 536 may result from the search. In some embodiments, as a result of the search, the service professional device 512 may be presented with a view of the semantically segmented 3D mesh 530 that may be similar to the view shown in FIGS. 4A-4C.

Figure 6A:
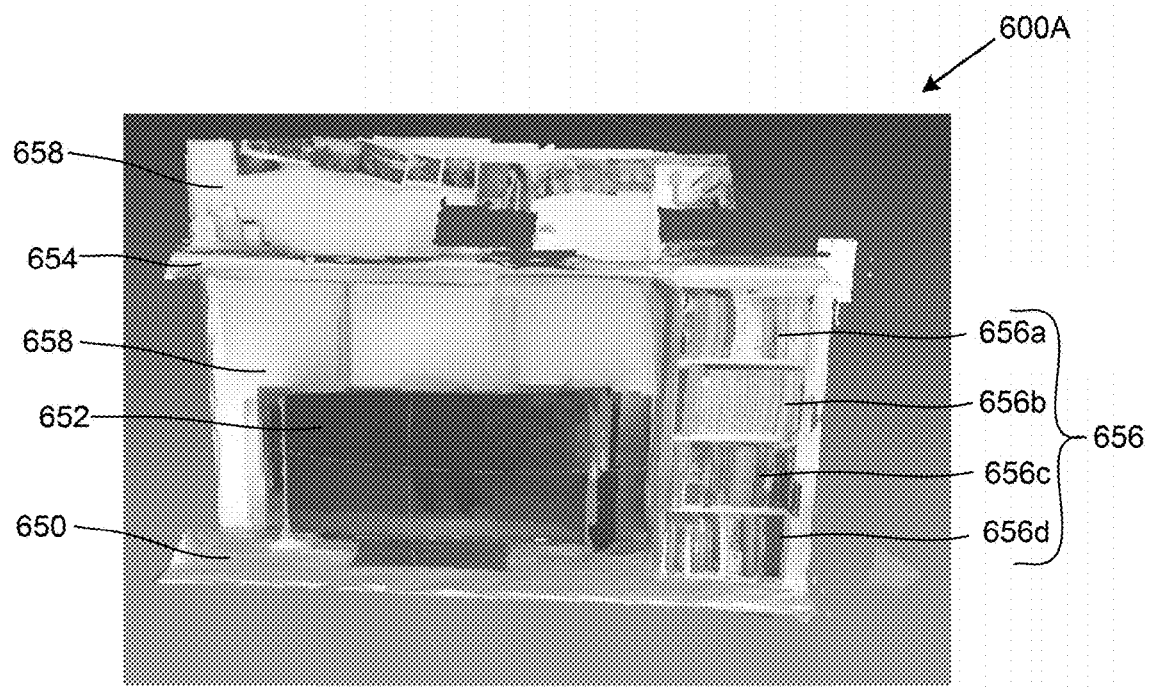
FIG. 6A-6B illustrate an elevation view and a perspective view of a semantically segmented 3D mesh of a shelf unit, in accordance with various embodiments.
Figure 6B:
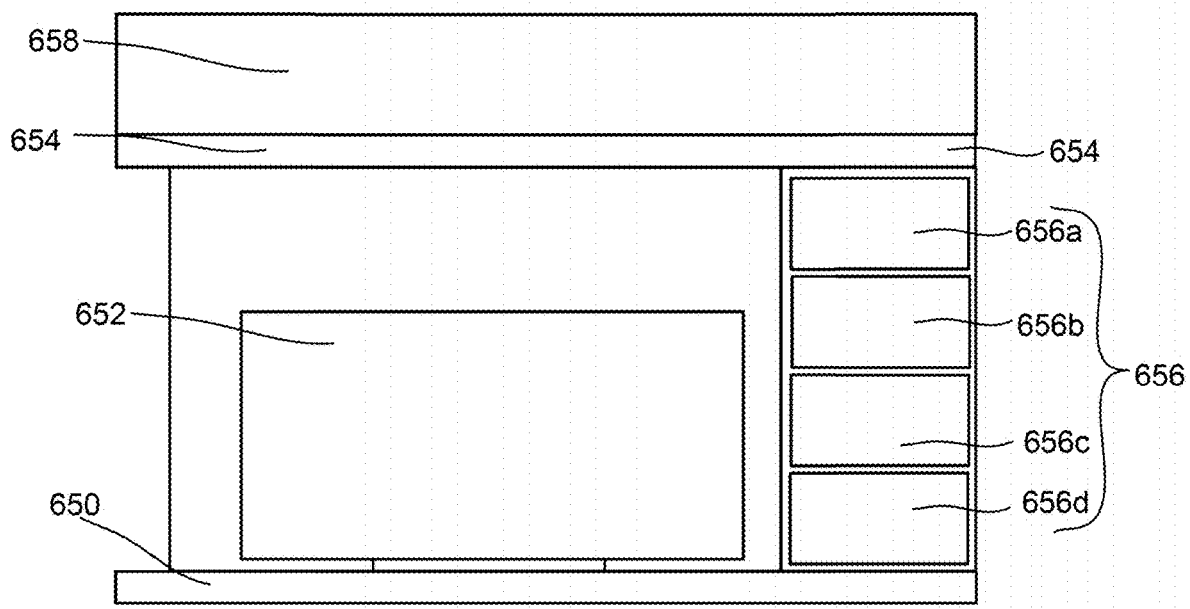

FIG. 6A-6B illustrate an elevation view and a perspective view of a semantically segmented 3D mesh of a shelf unit, in accordance with various embodiments. FIG. 6A shows a perspective view of a semantically segmented 3D mesh of a shelf unit 600A that may be found, for example, in a physical environment of a home or an office. The shelf unit 600A includes a television shelf 650 that a television 652 may rest on. Above the television shelf 650 there may be a table 654 that extends above the television shelf 650 and that also extends over a bookcase 656. A wall 658 may be above and/or behind the television shelf 650, the television 652, and the table 654. In embodiments, the bookcase 656 may include a plurality of individual shelves 656a, 656b, 656c, 656d onto which various books or other items may be placed.

In embodiments, the semantically segmented 3D mesh of FIG. 6A may be generated using the techniques described above, and in particular with respect to FIG. 3. For example, a user using a device, such as user 101 of FIG. 1 and device 302, may capture a 3D model which may be used to create a semantically segmented 3D mesh of the shelf unit 600A. In embodiments, the captured 3D model, which may be similar to 3D model 326 of FIG. 3, may then be sent to a server, which may be similar to server 220, where the semantically segmented 3D mesh of the shelf unit 600A is created. The semantically segmented 3D mesh of the shelf unit 600A may be similar to the semantically segmented 3D mesh 330 of FIG. 3, and may be similar to segments 550 of FIG. 5. FIG. 6B shows an elevation diagram of the shelf unit 600A.

Individual 3D segments of the semantically segmented 3D mesh of shelf unit 600A may include the television shelf 650, television 652, table 654, and bookcase 656. In embodiments, individual segments may also include the plurality of individual shelves 656a, 656b, 656c, 656d, and/or the various books or other items that may be placed on the individual shelves 656a, 656b, 656c, 656d.

Figure 7A:
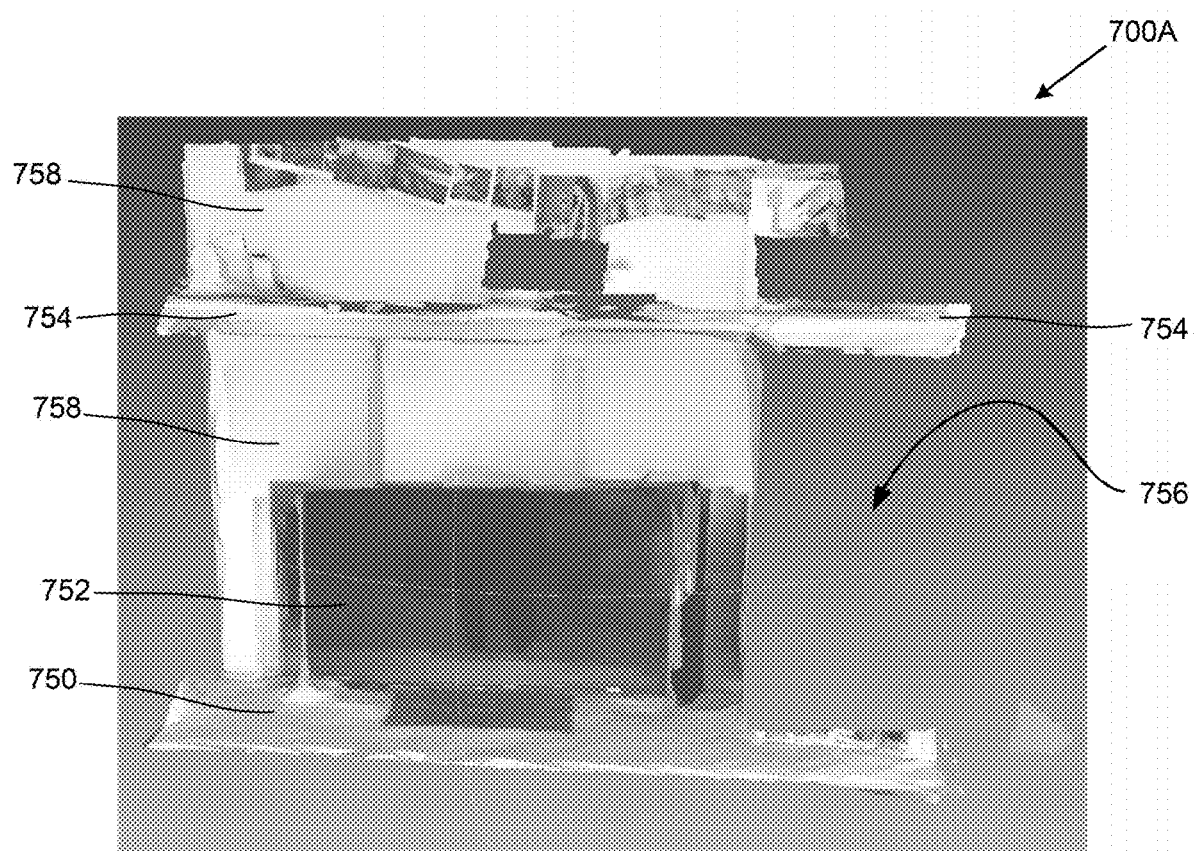
FIG. 7A-7B illustrate an elevation view and a perspective view of the semantically segmented 3D mesh of the shelf unit of FIG. 6A-6B that has been modified by a service professional, in accordance with various embodiments.
Figure 7B:
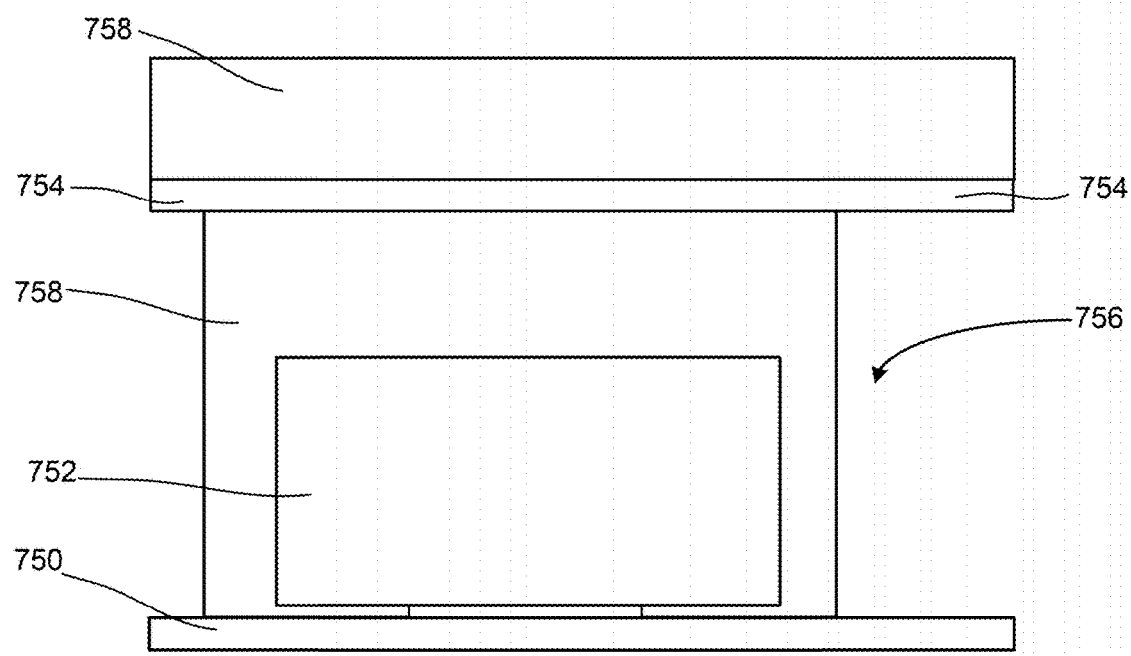

FIG. 7A-7B illustrate an elevation view and a perspective view of the semantically segmented 3D mesh of the shelf unit of FIG. 6A-6B that has been modified by a service professional, in accordance with various embodiments. FIG. 7A shows a perspective view of a rendering of a modified semantically segmented 3D mesh of a shelf unit 700A, which may be similar to the semantically segmented 3D mesh of the shelf unit 600A of FIG. 6A. In embodiments, a service professional, such as service professional 112 of FIG. 1 may have used service professional device 312 of FIG. 3 to review the semantically segmented 3D mesh of the shelf unit 600A of FIG. 6A, and make modifications according to a request from a customer, who may be similar to user 101 of FIG. 1.

In this example, the bookcase 656 and the shelves 656a, 656b, 656c, 656d of FIGS. 6A-6B have been removed to create a void 756. Subsequently, a modified semantically segmented 3D mesh of the shelf unit 700A, which may be similar to semantically segmented 3D mesh 330 of FIG. 3, may be created and sent to the user 101, which may be a customer desiring a home or office remodel. The user 101 may then review the modifications and then provide feedback to the service professional 112 regarding the modifications. In this example, the television shelf 750, television 752, table 754, and wall 758, which may be similar to television shelf 650, television 652, table 654, and wall 658 of FIG. 6A remain.

In embodiments, the user 101 may receive the modified semantically segmented 3D mesh of the shelf unit 700A either directly to a device, such as smartphone 102 of FIG. 1. In embodiments, the modified semantically segmented 3D mesh of the shelf unit 700A may be sent to a server such as server 320 of FIG. 3 as an updated segmented 3D mesh 330, where the customer may view it. In embodiments, the customer may look at the modified segmented 3D model from a variety of different perspectives to determine whether a service professional, using a service professional device 312 should be asked to make additional changes, or if a work order to implement the removal of the bookcase 656 from the customer's home or office should be placed. In embodiments, the additional changes related to modifications to the physical or visual appearance of the object, such as the bookcase 656, may be requested from the home or the office of the customer. FIG. 7B shows an elevation diagram of the shelf unit 700A.

Figure 8:
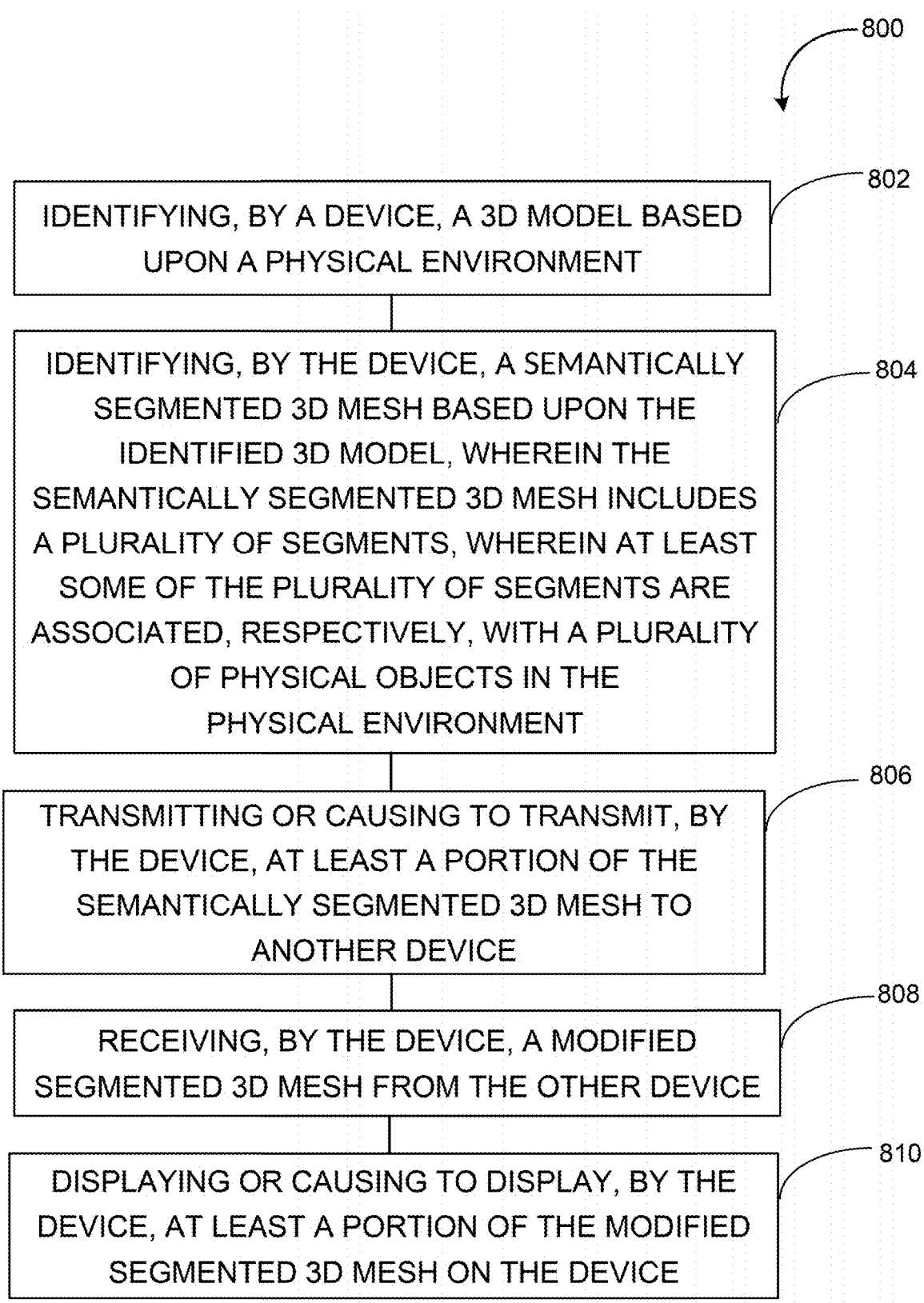
FIG. 8 illustrates an example process for transmitting a portion of a semantically segmented 3D mesh to another device for modification, in accordance with various embodiments.

FIG. 8 illustrates an example process for transmitting a portion of a semantically segmented 3D mesh to another device for modification, in accordance with various embodiments. In embodiments, process 800 may be performed using the system, apparatus, processes, and/or techniques described herein.

At block 802, the process may include identifying, by the device, a 3D model based upon a physical environment. In embodiments, the device may be similar to smartphone 102 of FIG. 1, device 202 of FIG. 2, device 302 of FIG. 3, or device 1100 of FIG. 11. In embodiments, the 3D model may be similar to 3D model 326 of FIG. 3.

At block 804, the process may further include identifying, by the device, a semantically segmented 3D mesh based upon the identified 3D model, wherein the semantically segmented 3D mesh includes a plurality of segments, wherein at least some of the plurality of segments are associated, respectively, with a plurality of physical objects in the physical environment. In embodiments, the semantically segmented 3D mesh may be similar to semantically segmented 3D mesh 130 of FIG. 1, or semantically segmented 3D mesh 330 of FIG. 3.

At block 806, the process may further include transmitting or causing to transmit, by the device, at least a portion of the semantically segmented 3D mesh to another device. In embodiments, the other device may be similar to service professional device 312 of FIG. 3.

At block 808, the process may further include receiving, by the device, a modified segmented 3D mesh from the other device.

At block 810, the process may further include displaying or causing to display, by the device, at least a portion of the modified segmented 3D mesh on the device.

Figure 9:
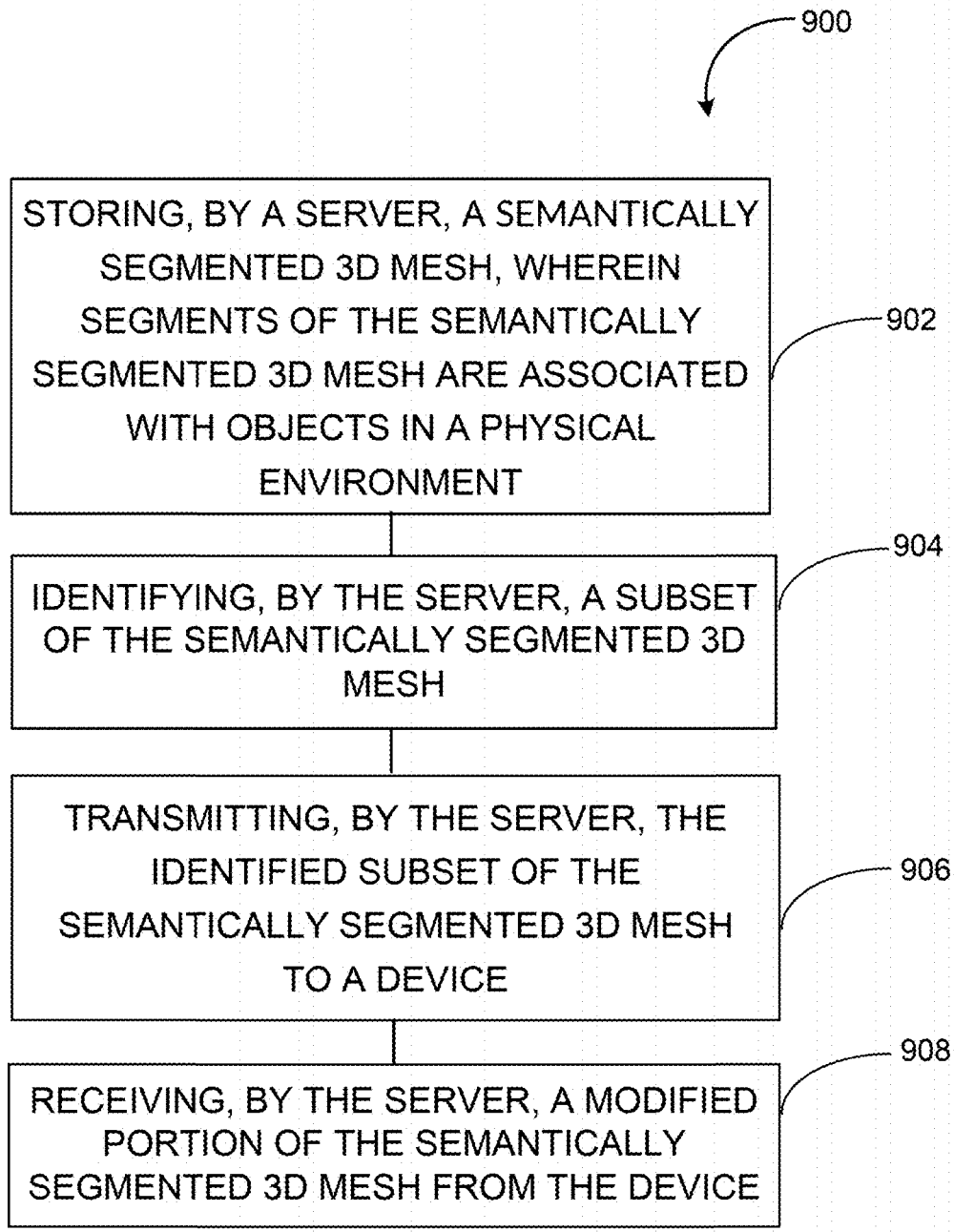
FIG. 9 illustrates an example process for a server storing a semantically segmented 3D mesh, in accordance with various embodiments.

FIG. 9 illustrates an example process for a server storing a semantically segmented 3D mesh, in accordance with various embodiments. In embodiments, process 900 may be performed using the system, apparatus, processes, and/or techniques described herein.

At block 902, the process may include storing, by the server, a semantically segmented 3D mesh, wherein segments of the semantically segmented 3D mesh are associated with objects in a physical environment. In embodiments, the server may be similar to server 220 of FIG. 2, or server 320 of FIG. 3. In embodiments, the semantically segmented 3D mesh may be similar to semantically segmented 3D mesh 230 of FIG. 2, or semantically segmented 3D mesh 330 of FIG. 3.

At block 904, the process may further include identifying, by the server, a subset of the semantically segmented 3D mesh. In embodiments, the subset of the semantically segmented 3D mesh may be similar to segment 536 and/or segments 550 of FIG. 5.

At block 906, the process may further include transmitting, by the server, the identified subset of the semantically segmented 3D mesh to a device. In embodiments, a device may be similar to smartphone 102 of FIG. 1, device 202 or service professional device 212 of FIG. 2, device 302 or service professional device 312 of FIG. 3, or service professional device 512 of FIG. 5.

At block 908, the process may further include receiving, by the server, a modified portion of the semantically segmented 3D mesh from the device.

Figure 10:
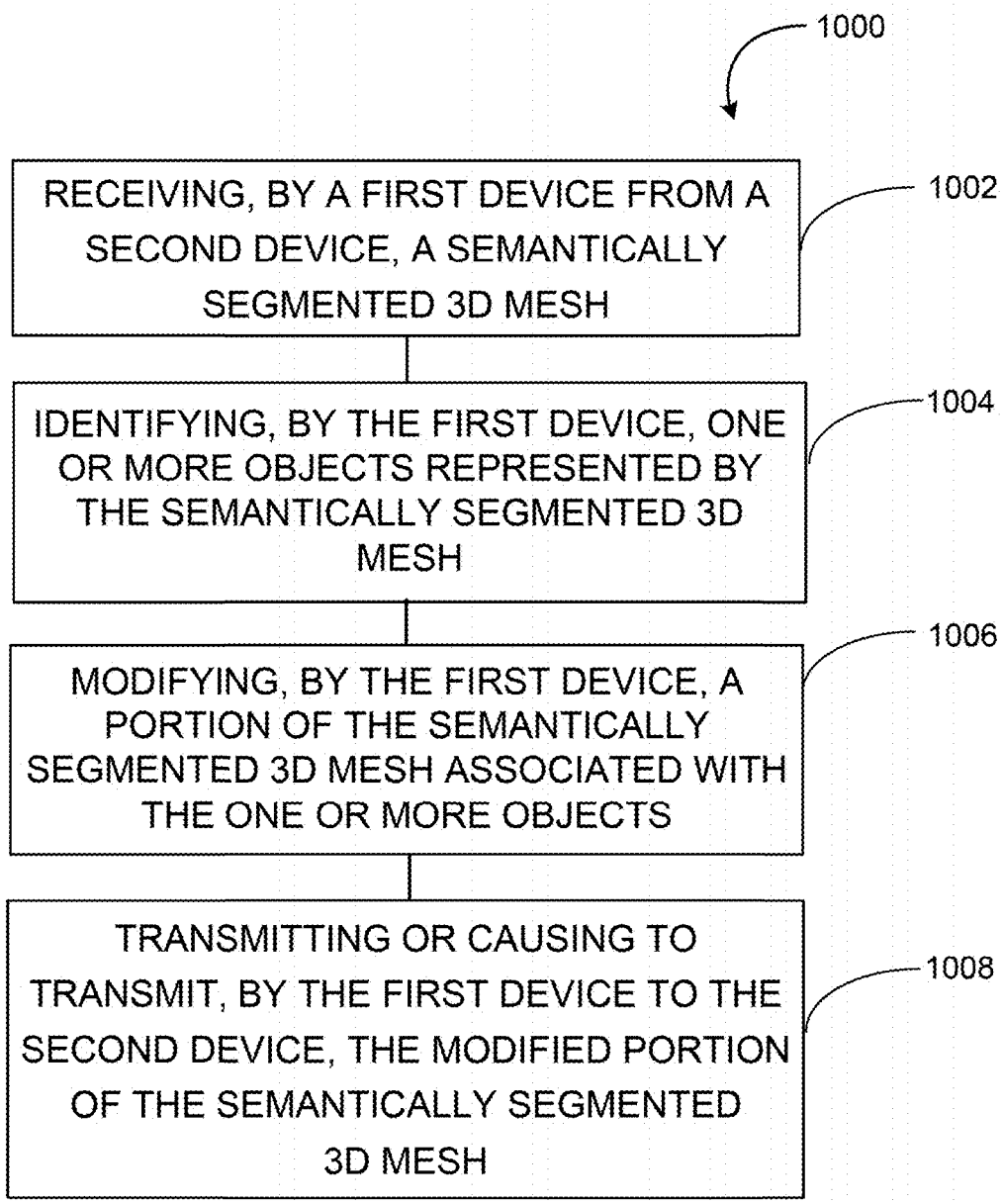
FIG. 10 illustrates an example process for remotely modifying a portion of a semantically segmented 3D mesh, in accordance with various embodiments.

FIG. 10 illustrates an example process for remotely modifying a portion of a semantically segmented 3D mesh, in accordance with various embodiments. In embodiments, process 1000 may be performed using the system, apparatus, processes, and/or techniques described herein.

At block 1002, the process may include receiving, by a first device from a second device, a semantically segmented 3D mesh. In embodiments, the first device may be similar to the service professional device 212 of FIG. 2, or to the service professional device 312 of FIG. 3. In embodiments, the second device may be similar to server 220 of FIG. 2, or server 320 of FIG. 3.

At block 1004, the process may further include identifying, by the first device, one or more objects represented by the semantically segmented 3D mesh. In embodiments, the one or more objects may be similar to the chairs 436, 438, the tables 440, 442, the back 436*a*, the armrest 436*b*, the leg 436*c*, the table top 442*a*, or the table body 442*b* of FIGS. 4A-4C. In embodiments, the one or may objects may be similar to television 652, television shelf 650, table 654, bookcase 656, wall 658, and/or plurality of individual shelves 656*a*, 656*b*, 656*c*, 656*d* of FIG. 6A.

At block 1006, the process may further include modifying, by the first device, a portion of the semantically segmented 3D mesh associated with the one or more objects.

At block 1008, the process may further include transmitting or causing to transmit, by the first device to the second device, the modified portion of the semantically segmented 3D mesh.

Figure 11:
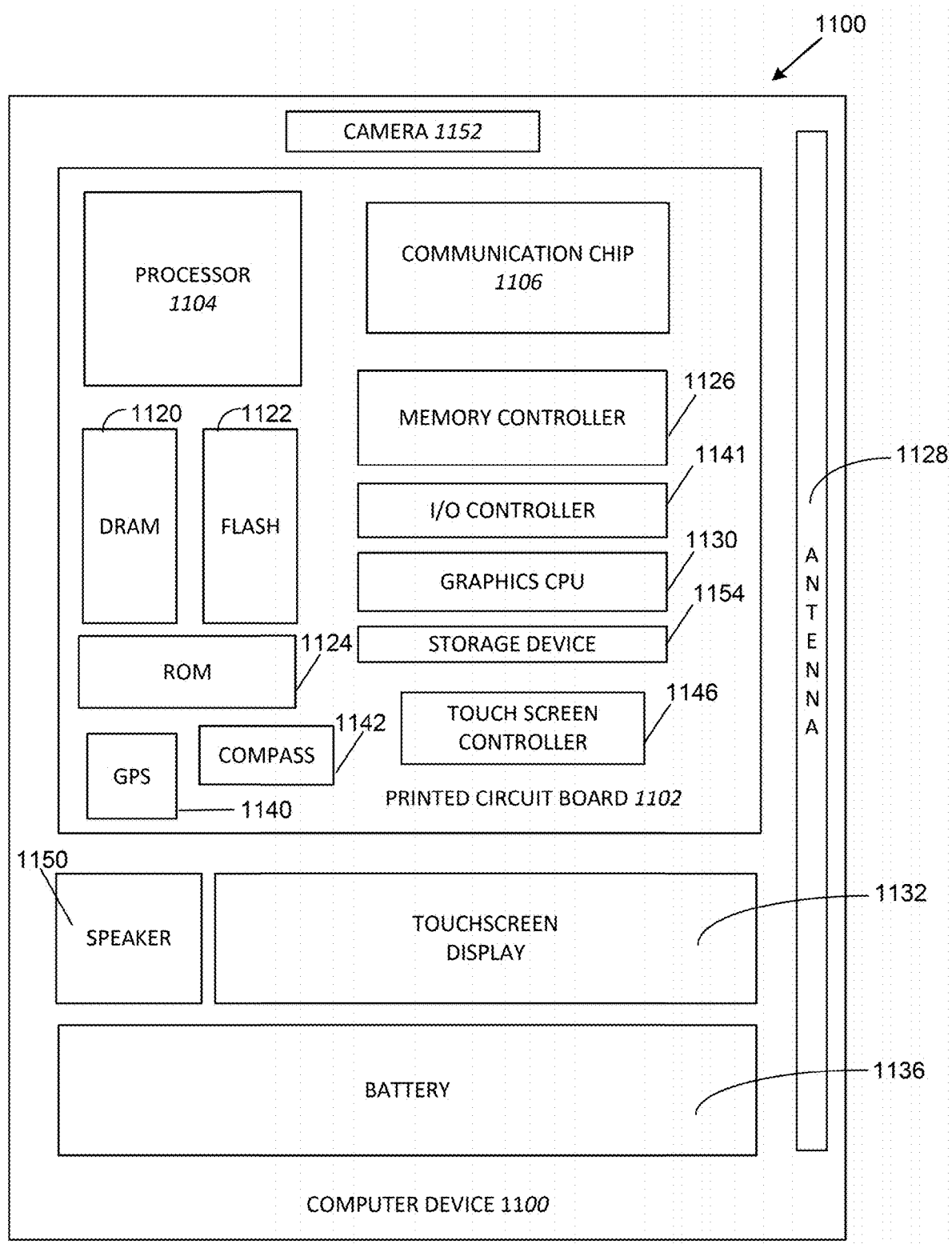
FIG. 11 is a block diagram of an example computer that can be used to implement some or all of the components of the apparatus or systems described in FIGS. 1-10, in accordance with various embodiments.

FIG. 11 is a block diagram of an example computer that can be used to implement some or all of the components of the apparatus or systems described in FIGS. 1-10, in accordance with various embodiments. Example computer device 1100 that may be employed by the apparatuses and/or methods described herein, in accordance with various embodiments. As shown, computer device 1100 may include a number of components, such as one or more processor(s) 1104 (one shown) and at least one communication chip 1106. In various embodiments, the one or more processor(s) 1104 each may include one or more processor cores. In various embodiments, the one or more processor(s) 1104 may include hardware accelerators to complement the one or more processor cores. In various embodiments, the at least one communication chip 1106 may be physically and electrically coupled to the one or more processor(s) 1104. In further implementations, the communication chip 1106 may be part of the one or more processor(s) 1104. In various embodiments, computer device 1100 may include printed circuit board (PCB) 1102. For these embodiments, the one or more processor(s) 1104 and communication chip 1106 may be disposed thereon. In alternate embodiments, the various components may be coupled without the employment of PCB 1102.

Depending on its applications, computer device 1100 may include other components that may be physically and electrically coupled to the PCB 1102. These other components may include, but are not limited to, memory controller 1126, volatile memory (e.g., dynamic random access memory (DRAM) 1120), non-volatile memory such as read only memory (ROM) 1124, flash memory 1122, storage device 1154 (e.g., a hard-disk drive (HDD)), an I/O controller 1141, a digital signal processor (not shown), a crypto processor (not shown), a graphics processor 1130, one or more antennae 1128, a display, a touch screen display 1132, a touch screen controller 1146, a battery 1136, an audio codec (not shown), a video codec (not shown), a global positioning system (GPS) device 1140, a compass 1142, an accelerometer (not shown), a gyroscope (not shown), a speaker 1150, a camera 1152, and a mass storage device (such as hard disk drive, a solid state drive, compact disk (CD), digital versatile disk (DVD)) (not shown), and so forth.

In some embodiments, the one or more processor(s) 1104, flash memory 1122, and/or storage device 1154 may include associated firmware (not shown) storing programming instructions configured to enable computer device 1100, in response to execution of the programming instructions by one or more processor(s) 1104, to practice all or selected aspects of the systems, techniques, processes, and/or apparatus, described herein, and in particular with respect to FIGS. 1-10. In various embodiments, these aspects may additionally or alternatively be implemented using hardware separate from the one or more processor(s) 1104, flash memory 1122, or storage device 1154.

The communication chips 1106 may enable wired and/or wireless communications for the transfer of data to and from the computer device 1100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1106 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond.

The computer device 1100 may include a plurality of communication chips 1106. For instance, a first communication chip 1106 may be dedicated to shorter range wireless communications such as Wi-Fi and Bluetooth, and a second communication chip 1106 may be dedicated to longer range wireless communications such as GPS, EDGE, GPRS, CDMA, WiMAX, LTE, Ev-DO, and others.

In various implementations, the computer device 1100 may be a laptop, a netbook, a notebook, an ultrabook, a smartphone, a computer tablet, a personal digital assistant (PDA), a desktop computer, smart glasses, or a server. In further implementations, the computer device 1100 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 12:
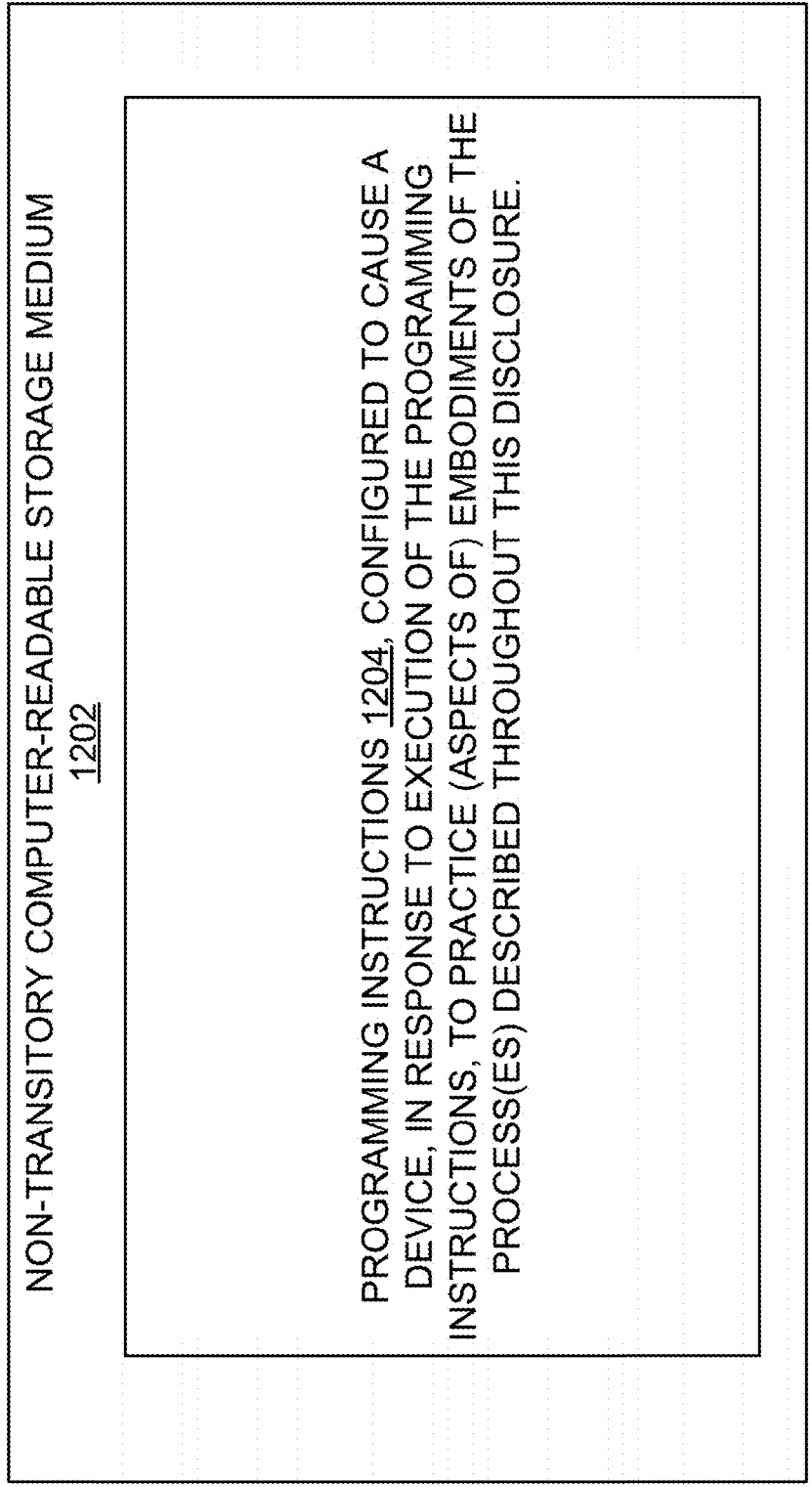
FIG. 12 is a block diagram of a computer-readable storage medium that can be used to implement some of the components of the system or methods disclosed herein, according to various embodiments.

FIG. 12 is a block diagram of a computer-readable storage medium that can be used to implement some of the components of the system or methods disclosed herein, according to various embodiments. FIG. 12 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1204. Programming instructions 1204 may be configured to enable a device, e.g., computer 1100, in response to execution of the programming instructions, to implement (aspects of) the systems, processes, techniques, and/or apparatus as described herein, and particular with respect to FIGS. 1-10. In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

EXAMPLES

Example 1 is a method for implementing a device, the method comprising: identifying, by the device, a 3D model based upon a physical environment; identifying, by the device, a semantically segmented 3D mesh based upon the identified 3D model, wherein the semantically segmented 3D mesh includes a plurality of segments, wherein at least some of the plurality of segments are associated, respectively, with a plurality of physical objects in the physical environment; transmitting or causing to transmit, by the device, at least a portion of the semantically segmented 3D mesh to another device; receiving, by the device, a modified segmented 3D mesh from the other device; and displaying or causing to display, by the device, at least a portion of the modified segmented 3D mesh on the device.

Example 2 includes the method of example 1, wherein identifying the 3D model based upon the physical environment further includes determining, by the device, the 3D model.

Example 3 includes the method of examples 1 or 2, wherein, before the step of identifying a 3D model, the method further includes scanning, by the device, the physical environment; and wherein identifying the 3D model further includes identifying the 3D model based upon the scan of the physical environment.

Example 4 includes the method of examples 1, 2, or 3, wherein identifying the semantically segmented 3D model of the scanned physical environment further includes: providing, by the device, at least a portion of the identified 3D model to a neural network; and receiving, by the device, the semantically segmented 3D mesh from the neural network.

Example 5 includes the method of example 4, wherein the neural network includes three or more layers.

Example 6 includes the method of examples 4 or 5, wherein the neural network is at least partially on a server.

Example 7 includes the method of example 6, wherein the semantically segmented 3D mesh is stored on the server.

Example 8 includes the method of examples 1, 2, 3, 4, 5, 6, or 7, wherein the device is a selected one or more of: a smartphone, a tablet, a laptop, or a camera.

Example 9 includes the method of examples 1, 2, 3, 4, 5, 6, 7, or 8, wherein the 3D model is a selected one of: a 3D point cloud or a 3D mesh.

Example 10 includes the method of examples 1, 2, 3, 4, 5, 6, 7, 8, or 9, wherein the other device is a selected one of: a smartphone, a tablet, a laptop, or a computer.

Example 11 includes the method of examples 1, 2, 3, 4, 5, 6, 7, 8, 9, or 10, wherein the physical environment is an interior of a building.

Example 12 is a method for implementing a server, the method comprising: storing, by the server, a semantically segmented 3D mesh, wherein segments of the semantically segmented 3D mesh are associated with objects in a physical environment; identifying, by the server, a subset of the semantically segmented 3D mesh; transmitting, by the server, the identified subset of the semantically segmented 3D mesh to a device; and receiving, by the server, a modified portion of the semantically segmented 3D mesh from the device.

Example 13 includes the method of example 12, wherein before the step of identifying the semantically segmented 3D mesh, the method further comprises: receiving, by the server, a 3D mesh; and determining, by the server, the semantically segmented 3D mesh based upon the received 3D mesh.

Example 14 includes the method of example 13, wherein determining the semantically segmented 3D mesh further includes determining the semantically segmented 3D mesh based upon a neural network.

Example 15 includes the method of examples 12, 13, or 14, wherein the device includes a selected one of: a smartphone, a tablet, or a laptop.

Example 16 includes the method of examples 12, 13, 14, or 15, wherein the device is a first device; and wherein identifying the semantically segmented 3D mesh further includes receiving the 3D mesh from a second device, wherein the second device includes a selected one of: a smartphone, a tablet, or a laptop.

Example 17 includes the method of example 16, wherein the second device is used to scan at least part of the physical environment.

Example 18 is a method for modifying a semantically segmented 3D mesh, the method comprising: receiving, by a first device from a second device, the semantically segmented 3D mesh; identifying, by the first device, one or more objects represented by the semantically segmented 3D mesh; modifying, by the first device, a portion of the semantically segmented 3D mesh associated with the one or more objects; and transmitting or causing to transmit, by the first device to the second device, the modified portion of the semantically segmented 3D mesh.

Example 19 includes the method of example 18, wherein identifying one or more objects represented by the segmented 3D mesh further includes: identifying, by the first device, one or more labels of the one or more objects; and searching, by the first device, the semantically segmented 3D mesh for the identified one or more labels of the one or more objects.

Example 20 includes the method of examples 18 or 19, wherein identifying the one or more objects represented by the segmented 3D mesh further includes: identifying, by the first device, an image of the one or more objects; and searching, by the first device, the semantically segmented 3D mesh for the identified image of the one or more objects.

Example 21 includes the method of examples 18, 19, or 20, wherein the one or more objects are associated with a physical environment.

Example 22 includes the method of examples 18, 19, 20, or 21, wherein modifying portions of the semantically segmented 3D mesh further includes a selected one or more of: removing one or more segments from the semantically segmented 3D mesh, adding a new segment to the semantically segmented 3D mesh, or replacing one or more segments in the semantically segmented 3D mesh.

Example 23 includes the method of examples 18, 19, 20, 21, or 22, wherein the first device is operated by a service professional.

Example 24 is an apparatus comprising: one or more computer processors; memory coupled with the one or more processors, the memory including instructions that, when executed, cause the one or more computer processors to: receive, from a device, a semantically segmented 3D mesh; identify one or more objects represented by the semantically segmented 3D mesh; modify portions of the semantically segmented 3D mesh associated with the one or more objects; and transmit the modified portions of the semantically segmented 3D mesh.

Example 25 includes the apparatus of example 24, wherein the device is a server.

Example 26 includes the apparatus of examples 24 or 25, wherein to transmit the modified portions of the semantically segmented 3D mesh further includes to transmit the modified portions of the semantically segmented 3D mesh to a selected one or more of: a server or the device.

Example 27 includes the apparatus of examples 24, 25, or 26, wherein to modify portions of the semantically segmented 3D mesh further includes a selected one or more of: to remove one or more segments from the semantically segmented 3D mesh, to add a new segment to the semantically segmented 3D mesh, or to replace one or more segments in the segmented 3D mesh.

What is claimed is:

1. A method for implementing a device, the method comprising:
    receiving, from a first device of a first user, a 3D model generated based upon a physical environment of the first user;
    generating, by a second device, a semantically segmented 3D mesh based upon the 3D model, wherein the semantically segmented 3D mesh includes a plurality of segments, wherein at least some of the plurality of segments are associated, respectively, with a plurality of physical objects in the physical environment;
    displaying or causing to display, by the second device, at least a portion of the semantically segmented 3D mesh on a third device of a second user;
    enabling, by the second device, the second user to search for a desired object of the plurality of physical objects to be found within the semantically segmented 3D mesh;
    displaying, by the second device on the third device, a set of one or more segments returned from the search that are associated with the desired object, the set of one or more segments including additional segments associated with other objects that are in proximity to the desired object;
    receiving, by the second device, a modified segmented 3D mesh, wherein modifications to the modified segmented 3D mesh include the second user removing, adding, and moving one or more of the plurality of physical objects represented in the set of one or more segments returned from the search; and
    displaying or causing to display, by the second device, at least a portion of the modified segmented 3D mesh on the first device of the first user.

2. The method of claim 1, wherein, before receiving the 3D model, the method further includes scanning, by the first device, the physical environment; and wherein the 3D model is generated based upon the scan of the physical environment.

3. The method of claim 1, wherein generating the semantically segmented 3D mesh further includes:
    providing, by the second device, at least a portion of the 3D model to a neural network; and
    receiving, by the second device, the semantically segmented 3D mesh from the neural network.

4. The method of claim 3, wherein the neural network includes three or more layers.

5. The method of claim 3, wherein the neural network is at least partially on a server.

6. The method of claim 5, wherein the semantically segmented 3D mesh is stored on the second device.

7. The method of claim 1, wherein the first device is a selected one or more of: a smartphone, a tablet, a laptop, or a camera.

8. The method of claim 1, wherein the 3D model is a selected one of: a 3D point cloud or a 3D mesh.

9. The method of claim 1, wherein the third device is a selected one of: a smartphone, a tablet, a laptop, or a computer.

10. The method of claim 1, wherein the second device comprises a server.

11. A method for implementing a server, the method comprising:
    receiving a 3D mesh from a device of a user;
    generating and storing, by the server, a semantically segmented 3D mesh from the 3D mesh, wherein segments of the semantically segmented 3D mesh are associated with a plurality of physical objects in a physical environment;
    identifying, by the server, a subset of the semantically segmented 3D mesh by:
        enabling the user to search for a desired object of the plurality of physical objects to be found within the semantically segmented 3D mesh, and
        receiving a set of one or more segments returned from the search that are associated with the desired object, the set of one or more segments including additional segments associated with other objects that are in proximity to the desired object;
    transmitting, by the server, the identified subset of the semantically segmented 3D mesh to the device of the user;
    receiving, by the server, a modified portion of the semantically segmented 3D mesh made by the user from the device, wherein modifications to the modified segmented 3D mesh include the user removing, adding, and moving one or more of the plurality of physical objects represented in the set of one or more segments returned from the search; and
    displaying or causing to display, by the server, at least the modified portion of the semantically segmented 3D mesh on the device of the user.

12. The method of claim 11, wherein generating and storing the semantically segmented 3D mesh further includes generating the semantically segmented 3D mesh based upon a neural network.

13. The method of claim 11, wherein the device includes a selected one of: a smartphone, a tablet, or a laptop.

14. The method of claim 11, wherein the device is a first device and the user is a first user; and wherein identifying the semantically segmented 3D mesh further includes enabling a second user of a second device to search for the desired object, and wherein the modified portion of the semantically segmented 3D mesh is received from the second device, wherein the second device includes a selected one of: a smartphone, a tablet, or a laptop.

15. The method of claim 14, wherein the first device is used to scan at least part of the physical environment.

16. A method for modifying a semantically segmented 3D mesh, the method comprising:
    receiving, by a server from a first device of a first user, a 3D mesh;
    generating, by the server, a semantically segmented 3D mesh from the 3D mesh, wherein segments of the semantically segmented 3D mesh are associated with a plurality of physical objects in a physical environment;

displaying or causing to display, by the server, at least a portion of the modified segmented 3D mesh on the first device and a second device of a second user;

identifying, by the server, one or more objects represented by the semantically segmented 3D mesh by:

enabling the first user or the second user to search for a desired object of the plurality of physical objects to be found within the semantically segmented 3D mesh, and receiving a set of one or more segments returned from the search that are associated with the desired object, the set of one or more segments including additional segments associated with other objects that are in proximity to the desired object;

receiving, by the server, a modified portion of the semantically segmented 3D mesh made by the first user or the second user, wherein modifications to the modified segmented 3D mesh include the first user or the second user removing, adding, and moving one or more of the plurality of physical objects represented in the set of one or more segments returned from the search; and displaying or causing to display, by the server, the modified portion of the semantically segmented 3D mesh on the first device and the second device.

17. The method of claim 16, wherein identifying one or more objects represented by the semantically segmented 3D mesh further includes:

identifying, by the server, one or more labels of the one or more objects; and searching, by the server, the semantically segmented 3D mesh for the identified one or more labels of the one or more objects.

18. The method of claim 16, wherein identifying the one or more objects represented by the semantically segmented 3D mesh further includes:

identifying, by the server, an image of the one or more objects; and searching, by the server, the semantically segmented 3D mesh for the identified image of the one or more objects.

* * * * *